United States Patent
Haumont

(10) Patent No.: US 6,654,589 B1
(45) Date of Patent: Nov. 25, 2003

(54) LEGAL INTERCEPTION IN A TELECOMMUNICATIONS NETWORK

(75) Inventor: Serge Haumont, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/509,318

(22) PCT Filed: Sep. 25, 1998

(86) PCT No.: PCT/FI98/00762

§ 371 (c)(1),
(2), (4) Date: Mar. 24, 2000

(87) PCT Pub. No.: WO99/17499

PCT Pub. Date: Apr. 8, 1999

(30) Foreign Application Priority Data

Sep. 26, 1997 (FI) .................................................. 973806

(51) Int. Cl.⁷ .............................................. H04B 17/00
(52) U.S. Cl. .................. 455/67.11; 455/410; 455/404.1
(58) Field of Search ................................. 455/67.1, 404, 455/410; 379/35, 230; 370/328, 338, 352, 353, 354, 355, 356, 401, 466

(56) References Cited

U.S. PATENT DOCUMENTS

| | | | |
|---|---|---|---|
| 5,590,171 A | * | 12/1996 | Howe et al. .................. 379/33 |
| 5,652,751 A | | 7/1997 | Sharony |
| 5,881,132 A | * | 3/1999 | O'Brien et al. ................ 379/35 |
| 5,913,161 A | * | 6/1999 | Ozulkulu et al. ............ 455/405 |
| 5,920,611 A | * | 7/1999 | Howell ......................... 379/35 |
| 5,923,744 A | * | 7/1999 | Cheng ................... 379/221.09 |
| 5,930,698 A | * | 7/1999 | Bertacchi ..................... 455/405 |
| 5,943,393 A | * | 8/1999 | Howell ......................... 379/35 |

FOREIGN PATENT DOCUMENTS

| | | |
|---|---|---|
| EP | 495 289 | 7/1992 |
| GB | 2 302 234 | 1/1997 |

* cited by examiner

*Primary Examiner*—Nguyen T. Vo
*Assistant Examiner*—T. Richard Lei
(74) *Attorney, Agent, or Firm*—Pillsbury Winthrop LLP

(57) ABSTRACT

Method and arrangement for intercepting a target mobile station in a GPRS network. A legal interception node is installed into the land-based portion of the radio network. An "intercepted" status is defined for mobile stations that are to be intercepted. In response to an order from a law-enforcement authority to intercept one of said mobile stations the status of such mobile station is changed to "intercepted" and at least some of the packets originating from such a mobile station or terminated thereto are routed and/or copied from at least one of the support nodes via the legal interception node to the law-enforcement authority.

16 Claims, 3 Drawing Sheets

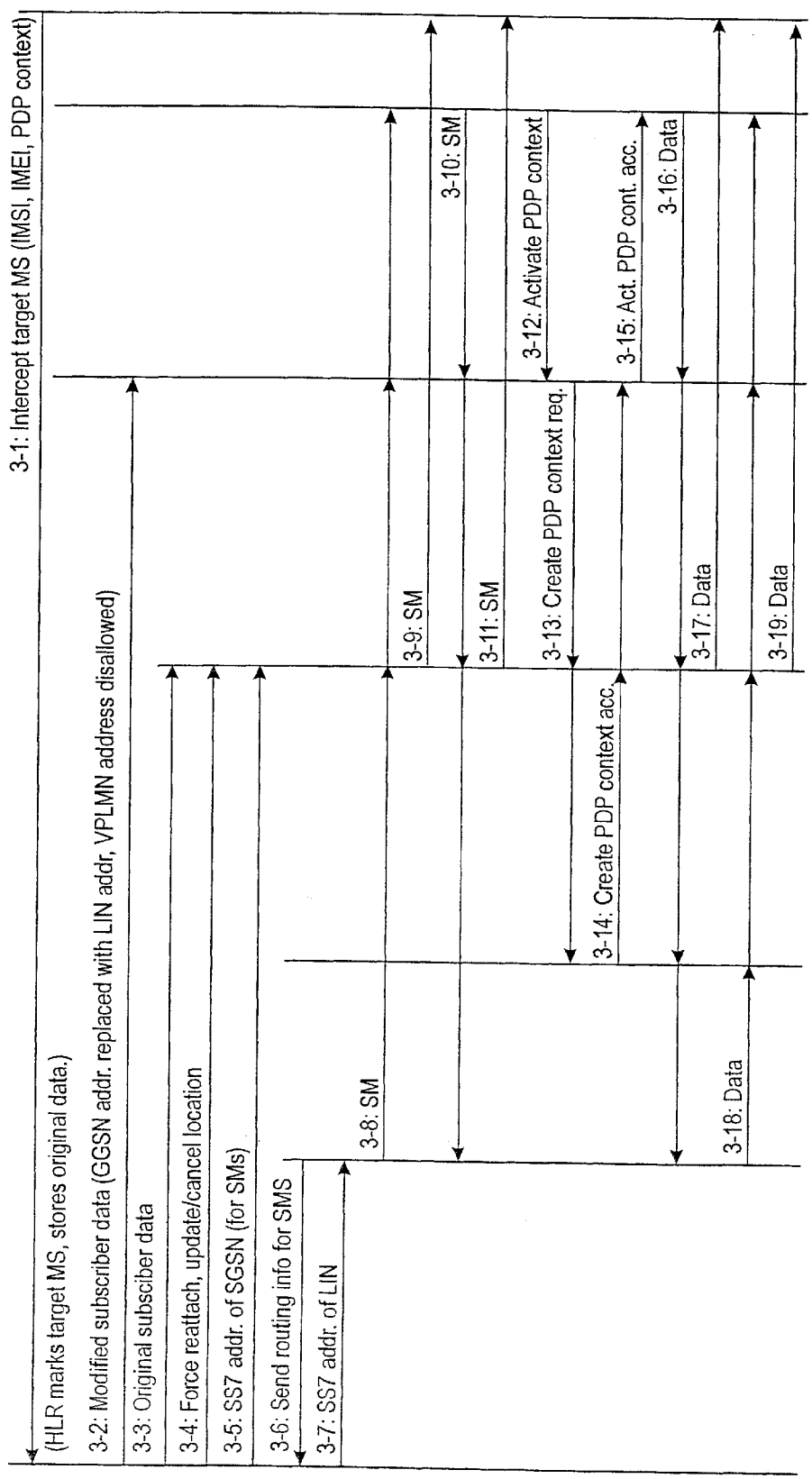

ns network, such as GPRS.
LEGAL INTERCEPTION IN A TELECOMMUNICATIONS NETWORK

BACKGROUND OF THE INVENTION

The present invention relates in general to telecommunications networks, preferably packet radio systems and more particularly, the invention relates to a method and an arrangement for providing legal interception in a mobile packet radio network, such as GPRS.

Mobile communication systems have been developed because there has been a need to allow people to move away from fixed telephone terminals without losing the ability to reach them. While the use of different data transmission services in offices has increased, different data services have also been introduced into mobile communication systems. Portable computers enable efficient data processing everywhere the user moves. As for mobile communication networks, they provide the user with an efficient access network to actual data networks for mobile data transmission. In order to do this, different new data services are designed for existing and future mobile communication networks. Digital mobile communication systems, such as the pan-European mobile communication system GSM (Global System for Mobile Communication), support particularly well mobile data transmission.

General Packet Radio Service (GPRS) is a new service in the GSM system, and it is one the items of the standardisation work of the GSM phase 2+ in ETSI (European Telecommunication Standard Institute). The GPRS operational environment consists of one or more sub-network service areas, which are interconnected by a GPRS backbone network. A sub-network comprises a number of packet data service nodes, which are referred to as GPRS support nodes (or agents) in this context, each packet data service node being connected to a GSM mobile communication network in such a manner that it is capable of providing a packet data service for mobile data terminal equipment via several base stations, i.e. cells. The intermediate mobile communication network provides circuit switched or packet switched data transmission between a support node and mobile data terminal equipment. Different sub-networks are connected to an external data network, such as a public switched packet data network PSPDN. The GPRS service thus produces packet data transmission between mobile data terminal equipment and external data networks, a GSM network acting as an access network. One aspect of the GPRS service network is that it operates almost independently of the GSM network. One of the requirements set for the GPRS service is that it must operate together with external PSPDNs of different types, for instance with Internet or X.25 networks. In other words, the GPRS service and a GSM network should be capable of serving all users, irrespective of which type of data networks they want to register in via the GSM network. This means that the GSM network and the GPRS service have to support and handle different network addressing methods and data packet formats. This handling of data packets also comprises the routing thereof in a packet radio network. In addition, the users should be capable of roaming from a GPRS home network into an external GPRS network. A roaming user may use a PDP (Packet Data Protocol) which is not supported by the visited operator, which, however will should be able to transfer the user data to the home network without understanding the user PDP.

Referring to FIG. 1, a typical scenario for a GPRS network will now be described. It should be understood that the architecture of GPRS systems is not as mature as that of GSM systems. Therefore, all GPRS terms should be interpreted as terms for illustration and not for limitation. A typical mobile station constituting a mobile data terminal equipment consists of a mobile station MS in a mobile communication network, and a portable computer PC connected to the data interface of said mobile station MS. The mobile station MS may be for instance a Nokia 2110, which is manufactured by Nokia Mobile Phones Ltd., Finland. By means of a PCMCIA-type Nokia Cellular Datacard, which is manufactured by Nokia Mobile Phones Ltd., the mobile station can be connected to any portable PC which is provided with a PCMCIA card location. The PCMCIA card thus provides the PC with an access point, which supports the protocol of the telecommunication application used in the PC, for instance CCITT X.25 or Internet Protocol IP. Alternatively, the mobile station may directly provide an access point which supports the protocol used by the application of the PC. Furthermore, it is possible that the mobile station MS and the PC are integrated into one unit within which the application program is provided with an access point supporting the protocol used by it. An example of such a mobile station with an integrated computer is the Nokia Communicator 9000, also manufactured by Nokia Mobile Phones Ltd., Finland.

Network elements BSC and MSC are known from a typical GSM network. The arrangement of FIG. 1 includes a separate support node SGSN (Serving GPRS Support Node) for GPRS service. This support node SGSN controls certain actions of the packet radio service on the network side. Such actions comprise logging on to the system and logging off from the system by the mobile stations MS, routing area updates of the mobile stations MS, and routing of data packets to their proper targets. Within this application, the concept of "data" should be understood broadly to cover any information transferred in a digital communication system. Such information can comprise speech coded into digital form, data transmission between computers, telefax data, short pieces of program code, etc. The SGSN node can be located at a BTS site or at a BSC site or at an MSC site, or it can be located separately from any of these elements. The interface between a SGSN node and the Base Station Controller BSC is called a Gb interface.

The following GPRS/GSM terminology will be used: GTP=GPRS Tunneling Protocol, MM context=Mobility Management Context, DNS=Domain Name Server, HPLMN Home PLMN (Public Land Mobile Network), VPLMN=Visited PLMN, BG=Border Gateway. For convenience, a "target MS" will be used as a shorthand notation for an "MS to be intercepted". Verbs like "think" or "believe" in connection with network elements simply mean that this network element sees no difference if a new network element (using the protocols and identifiers of an existing network element) is inserted to the network.

A society must find a balance between protecting the privacy of its citizens and protecting them against crime. Usually this balance is achieved by providing law-enforcement authorities limited access to monitor private communications. A law-enforcement authority (LEA) may e.g. obtain a court order for intercepting a communication line when it is felt that the need to protect the public overrides the need for privacy. Within the context of this application, such interception of a communication line by legally authorised entities will be referred to as "legal interception".

This widely accepted principle has many implications within the telecommunications industry. In situations like legal interception, the equipment suppliers and network operators must adapt themselves to two entirely different environments. On the one hand, telecommunication equipment are designed to be used in several networks and countries. The industry itself is largely responsible for making the equipment compatible across the various borders. The development is controlled by laws of economy. On the other hand, the requirements for legal interception may vary abruptly from one country to the next, and they may be changed at will by legal decisions. More specifically, the industry and the network operators face several different problems. They must make sure that only the persons or entities with a valid legal authorisation are able to access the intercepted data. The interception should incur no noticeable changes to the user. For example, a user might be able to detect an added delay and thus detect the interception. One of the pertinent technical problems is that the authorities may not be able to access the home network (HLR and/or GGSN) of a visiting user. Also, it is should be possible to perform the interception using only the data network address of the user or the equipment, such as the IMSI or IMEI. In addition to intercepting the contents of the communication, it should be possible to determine the source and/or the destination of the data packets. In a GPRS network, these problems are aggravated by the fact that GGSN node can be in the user's home network or in a visited network. In the former case, the user's data network address is static, whereas in the latter case it is dynamic. Also, different GGSN nodes might be used simultaneously.

DISCLOSURE OF THE INVENTION

Based on the foregoing description, it is an object of the present invention to create a method and suitable network elements (nodes) for providing legal interception in a packet radio network, such as GPRS. The method and the network elements according to the invention should solve as many of the above problems as possible. The object of the invention will be achieved with a method and network elements which are characterized by what is disclosed in the appended independent claims. Advantageous embodiments of the present invention will be presented in the dependent claims.

The invention is based on the vision that legal interception in any one PLMN should be performed from one place only. In other words, any network elements related to legal interception should serve an area which is as large as the laws and regulations allow. The invention is also based on the idea that the technical and legal questions regarding legal interception are of such magnitude and importance that a new and separate network functionality is required.

In general terms, the invention provides a method for intercepting traffic between a first node and a second node of a telecommunications network. A legal interception node (LIN) is installed into the network. In response to an order from a law enforcement authority (LEA). At least some of the traffic to be intercepted is sent to the legal interception node. The legal interception node sends at least some of the traffic sent to it to the law enforcement authority.

The invention is applicable to a mobile packet radio network, such as GPRS. In such a system, the traffic is conveyed in packets comprising a header and a payload part. Some packets relate to location information of terminals (mobile stations) in the network. This location information may be transmitted in the header part or the payload part of the packets. According to a preferred embodiment, the LIN is able to separate the location information from the user data, i.e. understand the protocol(s) used in the network. In response to an order from the LEA, the LIN may send the LEA (1) the user data, (2) the location information, or (3) both.

Since the invention integrates the added functionality into the least possible number of network elements, a flexible method and system for legal interception is provided. The embodiments according to the invention are adaptable to changing technical and legal situations with relative ease. The invention avoids the need to intercept traffic (data and/or signalling) in several different network elements, such as SGSN and GGSN nodes. No unnecessary information related to the identity of a suspected user is given away to third parties, such as other network operators. The invention enables the law enforcement authorities to intercept communications to/from a suspected user either in the user's home network or his/her visited network. Honest (but suspected) users are not burdened with extra charging and dishonest users can not detect long-term intercepting by means of increased charging. In most situations, the added delays are too small to be detectable.

BRIEF DESCRIPTION OF THE DRAWINGS

In the following, the invention will be described by means of preferred embodiments with reference to the accompanying drawing, in which:

FIG. 1 illustrates in block diagram some of the elements of a packet radio system which the invention relates to;

FIG. 3 shows a signalling diagram illustrating an embodiment of the invention.

DETAILED DESCRIPTION OF THE INVENTION

Preferred embodiments of the invention will be described in connection with a GPRS environment. Reference is now made to FIG. 2 in connection with FIG. 1. The functionality according to the invention has been integrated into a network element referred to as a legal interception node (LIN). All data to be intercepted is to be routed via this LIN node. Logically, the LIN is installed between two support nodes, preferably between an SGSN and a GGSN node. To the SGSN the LIN appears to be a pseudo-GGSN (or a fake GGSN) and correspondingly, to the GGSN the LIN appears to be a pseudo-SGSN. Another common expression is that the LIN emulates an SGSN to a GGSN and vice versa.

The home location register HLR will still have the address of the real SGSN currently serving the user. (An optional placement of the LIN will be discussed later, under section C.)

In most cases, certain modifications are needed in other network elements as well. The home location register HLR, and more specifically, the subscription profiles stored therein must be able to store the information that a MS is being intercepted. This information can be stored by adding an extra status field to the existing user profile, or by maintaining a list of intercepted mobile stations. In the examples below, it will be assumed that all extra status fields will be added to existing user profiles. Also, when a user's subscriber profile is changed, the original profile must be stored somewhere.

Some possible scenarios for legal interception will now be studied in more detail.

A.1. Interception of a Roaming MS by its HPLMN Operator

Figure 1:
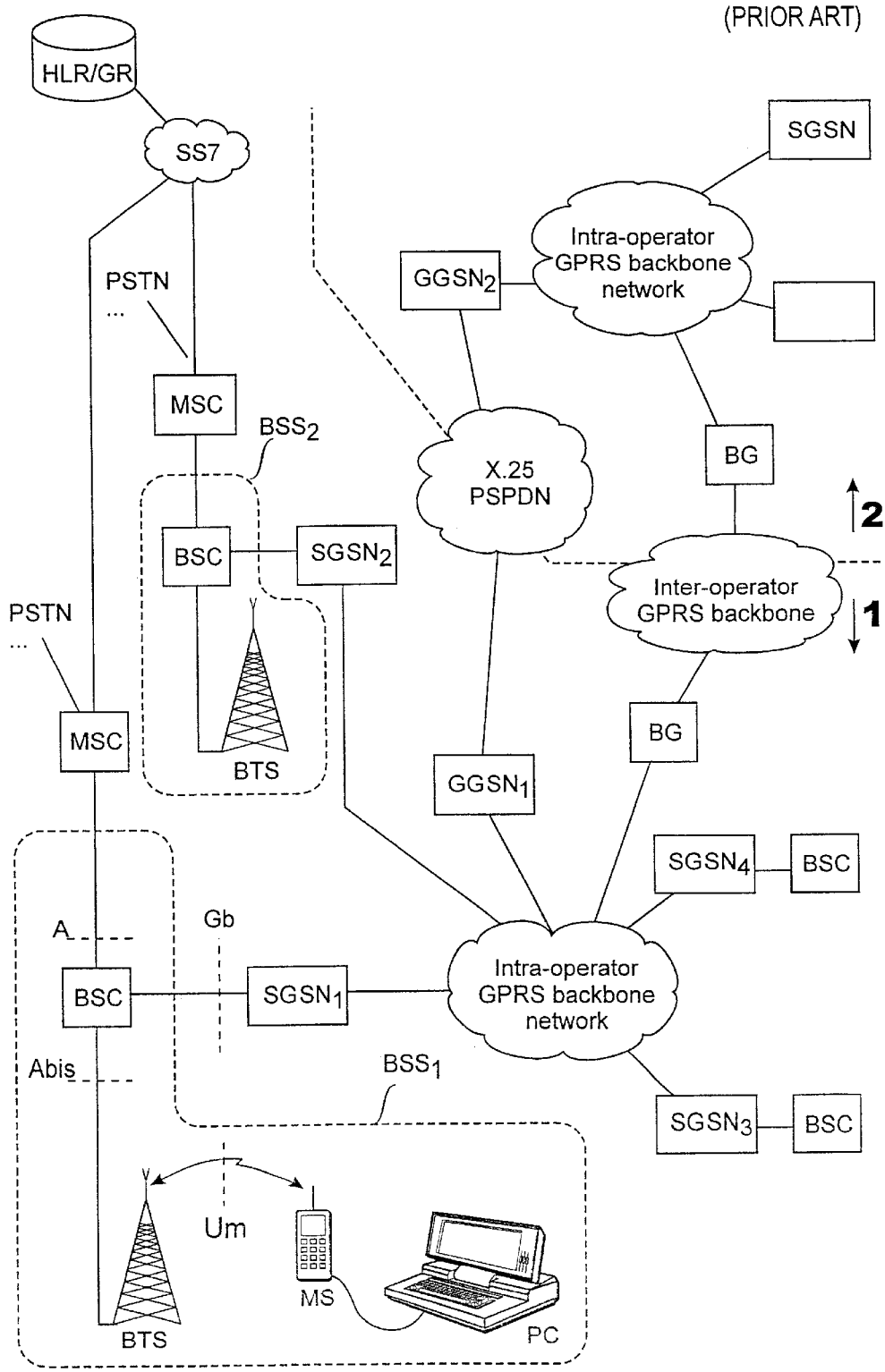
Figure 2A:
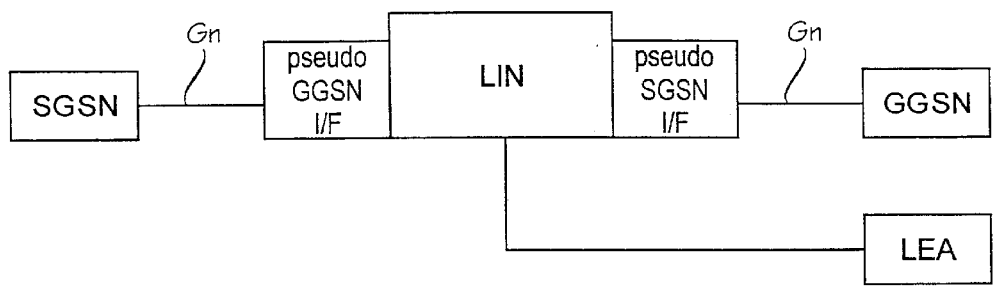
FIGS. 2A–2C show portions of FIG. 1, supplemented with a legal interception node (LIN) according to the invention in various arrangements.

This is the most complex scenario. In FIG. 1, network 1 is the HPLMN and network 2 is the VPLMN of the target MS. The MS is roaming in the VPLMN 2. As already mentioned, some countries require that the interception be transparent (i.e. invisible) to other networks. Reference is now made to FIGS. 2A and 3. In step 3-1, the operator of HPLMN 1 receives an order to intercept a MS. The operator marks the subscriber profile of the target MS in the HLR by setting the "intercepted" status. In step 3-2, the HLR modifies the subscriber data in two ways and sends it to the SGSN serving the user. For each PDP context, the subscriber data will contain as its GGSN address the (IP-type) address of the LIN. Also, the status field VPLMN ADDRESS ALLOWED (and optionally, the status field DYNAMIC ADDRESS ALLOWED) should be disallowed. This modification prevents the SGSN from choosing a GGSN at will. Instead, the SGSN is forced to use the LIN as its GGSN.

The HLR still stores the original subscriber data (which it would normally send to the SGSN in case of a non-intercepted user). In step 3-3, this original subscriber data will be sent to the LIN which, however, will not send it to the SGSN.

In step 34, if the MS was already attached, it can be forced to reattach. This makes the interception effective immediately, taking into account the new subscriber profile data. If the MS was not attached, and the SGSN had stored the subscriber data, the HLR will update (or cancel) the subscriber data in the SGSN. (In other embodiments, notably A.2, the SGSN will be aware that this change was made though the LIN, and the SGSN will only establish the tunnel (a connection to the GGSN using GTP) through the LIN without forcing the MS to reattach.)

Network requested context activation (NRCA) is feature which allows a GGSN to receive a packet for a PDP context which is not yet activated. The GGSN will interrogate the HLR in order to know which SGSN is serving the MS (GPRS attach). Then the MS will be asked to activate the PDP context. If NRCA is used, the HLR replaces the logical name of the SGSN with the logical name of the LIN. (A logical name is a DNS name which can be mapped to an IP address. This step is not shown separately in FIG. 3.) This has the effect that a GGSN asking for the logical name (or the IP address) of the SGSN will in fact contact the LIN. Then the HLR sends the original subscriber data including the original parameters (GGSN address, VPLMN ADDRESS ALLOWED, and optionally DYNAMIC ADDRESS ALLOWED) to the LIN. A suitable message for this is INSERT SUBSCRIBER DATA.

When the target MS attaches (or reattaches) to the GPRS, the SGSN behaves normally in every respect. From its point of view, nothing is changed. It is not aware that the user's GGSN address sent to it is in fact the address of the LIN.

In step 3-5, if the LIN has to intercept a mobile terminated short message, the HLR must also send the SS7 address of the SGSN to the LIN. In step 3-6, when the HLR receives a SEND ROUTING INFO FOR SMS message, it returns (in 3-7) the SS7 address of the LIN instead of that of the SGSN. In 3-8, a short message SM is sent to the LIN which forwards it to the SGSN and sends (in 3-9) a copy thereof to the LEA. Of course, it is not essential to send intercepted short messages and/or data to the LEA directly. Rather, this intercepted information can be collected in a separate file reserved for the LEA. A corresponding process for an mobile originated SM is shown in steps 3-10 and 3-11.

To use PDP, the user must activate a PDP context. Before this activation, the user can only use SMS. In step 3-12, when the target MS activates the PDP context the SGSN sends (in 3-13) a CREATE PDP CONTEXT REQUEST message to the LIN. (Of course, the SGSN thinks It will send this message to the GGSN but the address of the GGSN in its subscriber data is actually the address of the LIN.) From the subscriber data the LIN has to derive which GGSN the PDP context should be activated to.

Next, the LIN forwards the CREATE PDP CONTEXT REQUEST message to the GGSN. The GGSN is not aware that this request is not coming from a real SGSN. It stores the IP address of the LIN to its routing context (as an address of an SGSN). In step 3-14, the GGSN returns (via the LIN) a CREATE PDP CONTEXT ACCEPT message to the SGSN. During this procedure the LIN has established its own context to route the packets between the SGSN and the GGSN. This context contains a TID (Tunnel Identifier) made of IMSI and NSAPI (Network layer Service Access Point Identifier) and the IP addresses of the SGSN and the GGSN. Because of this, every packet with this TID coming from this SGSN is routed to this GGSN and vice versa. Next, the SGSN replies with an ACTIVATE PDP CONTEXT ACCEPT message (3-15) to the MS.

After these operations, all traffic for this PDP context will go through the SGSN, LIN and the GGSN. Reference mark 3-16 represents mobile originated data packets and 3-18 mobile terminated data packets. Copies of these data packets are sent to the LEA by the LIN in steps 3-17 and 3-19, respectively.

It should be noted that with the operations described above, the SGSN can be in the HPLMN or VPLMN because it only performs normal GPRS procedures.

A.2. Interception of a Non-roaming MS by its HPLMN Operator

If the target MS is in its HPLMN, the SGSN may be aware of the interception. In this case the HLR could include the "intercepted" status in the subscriber data sent to the SGSN. The SGSN may send the intercepted data in one (or more) of the following ways:

As already described in connection with scenario A.1. (This does not require any special skills from the SGSN).

As described later in connection with scenario B.1. (The SGSN knows the address of the LIN in advance and uses it instead of the address of the GGSN. It also informs the LIN of the GGSN address to contact.)

As described later in connection with scenario B.3. (The SGSN simply duplicates all the traffic.)

As the SGSN is aware of the interception, it may send signalling information to the LIN in cell update messages, routing area update messages, attach messages or detach messages, etc. This information may be sent encapsulated in GPRS Tunneling Protocol GTP. If required, the SGSN may also send short messages to the LIN encapsulated in GTP. If the target MS requests a specific GGSN in the PDP context activation the SGSN could send the address of this GGSN to the LIN.

B. Interception of an MS by the VPLMN Operator

In a visited network the MS must use the SGSN of the visited PLMN. It can also use a GGSN. Thus the SGSN must be informed of the identity of the target MS. Suitable identifiers are the IMSI, the eventual PDP address or the IMEI. However, if the PDP address or the IMEI of the target MS are used, the SGSN should inform the LIN of the corresponding IMSI. This identifier of the target MS can be entered manually or through the OAM (Operation And Maintenance). It can also be stored in a database that the SGSN can interrogate.

When a new user performs a GPRS attach, the SGSN will know its IMSI. From the subscriber data, the SGSN will also know the PDP address it subscribed to. The SGSN can request the IMEI of the MS. Then is has to check if any of these identifiers indicate that the MS should be intercepted. If yes, it marks the target MS by setting the "intercepted" status in its subscriber data. It should be noted that if the SGSN changes (i.e. the MS performs an inter-SGSN routing area update), the new SGSN should retrieve this parameter from the old SGSN. (This may be difficult or impossible if the old SGSN and the new one are in different countries.)

There may be a legal requirement that the operator inform the authorities of the location of the target MS. In this case, each time the routing area of the MS changes (or any other location identifier such as the cell, if available), and each time the MS performs a GPRS attach or detach operation, the SGSN should send a message to inform the LIN of the changed location. This message could be transferred using GTP. Also, short messages to the SGSN can be sent encapsulated in GTP.

Three possible variations within this general outline (MS in VPLMN) will be described.

B.1. The LIN Acting as a SGSN Only to the GGSN

In this case the attach procedure is performed normally, as described in GPRS recommendation 03.60. The SGSN knows the IP address of the LIN. Alternatively, the SGSN may retrieve the IP address of the LIN (from a DNS server) to avoid updating all SGSN's if the IP address of the LIN should change.

When the MS requests a PDP context activation the SGSN generates a normal CREATE PDP CONTEXT REQUEST message (which contains the IMSI of the MS). However, the SGSN sends this message to the LIN instead of the GGSN. The SGSN will also decide which GGSN has to be activated and it will send this information to the LIN. This information can be included in the previous message, or in a separate message. To this GGSN the LIN sends a very similar PDP CONTEXT ACTIVATION REQUEST (only substituting its own address for that of the SGSN). From the point of view of the GGSN, the LIN is now acting as the SGSN and the GGSN will now return a CREATE PDP CONTEXT RESPONSE message to the LIN. Then the LIN will forward this response to the SGSN.

During this procedure the LIN has established its own routing table for the MS. Now the PDP context is activated and the SGSN sends all uplink data packets to the LIN which duplicates and forwards them to the GGSN. In the reverse direction, the GGSN sends all downlink data packets to the LIN which duplicates and forwards them to the SGSN.

If the network uses network requested context activation, the SGSN should not give its real logical name to the HLR but it should send the logical name of the LIN instead.

In this embodiment, the mobile terminated short messages will not be transferred through the LIN, because the HLR knows the SS7 address of the real SGSN.

B.2. The LIN Acting as an SGSN Both to the GGSN and the HLR

Figure 2B:
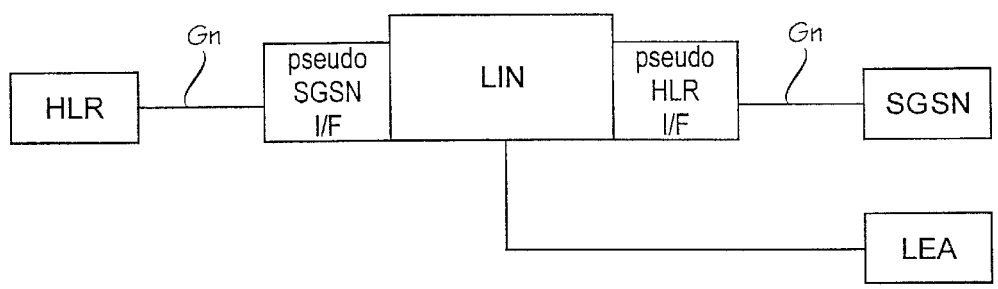

Reference is now made to FIG. 2B. If during the attach procedure the SGSN discovers a new target MS, it will mark the context of this MS with an "intercepted" status. The SGSN will send to the LIN at least the SS7 address and the logical name of the SGSN, as well as the IMSI of the target MS. Again, this information can be sent in a location update message or in a separate GTP message. If necessary, the corresponding IMEI may be sent to the LIN as well. The LIN will then send an UPDATE LOCATION message to the HLR, indicating the IMSI of the target MS and its own SS7 address and logical name, instead of the corresponding parameters of the SGSN. The HLR will then send a CANCEL LOCATION message to what it believes is the "old" SGSN. In this case, however, the old SGSN is the same as the new SGSN which just found a new target MS. (For example, a timer could be used for searching for new target users regularly.) The SGSN should ignore the CANCEL LOCATION message but still acknowledge it. Then the HLR will send an INSERT SUBSCRIBER DATA message to what it believes to be the "new" SGSN but which actually is the LIN which stores this information and forwards it to the real SGSN.

It should be noted that after detach the LIN should store the address of the old SGSN. If the same target MS attaches to another SGSN this new SGSN will know from the MM context retrieved from the old SGSN that the MS must be intercepted. Therefore it will send an UPDATE LOCATION message to the LIN which will order the old SGSN to cancel its PDP and MM contexts like an HLR does.

When the MS should no longer be intercepted, the SGSN should turn off the "intercepted" status of the MS and send an UPDATE LOCATION message to the HLR which will store the address of the right SGSN and erase the address of the LIN. Then the HLR will send a CANCEL LOCATION message to the LIN.

When the MS performs a PDP context activation, the SGSN generates a normal CREATE PDP CONTEXT REQUEST message (containing the IMSI of the MS) but the SGSN sends this message to the LIN instead of the GGSN. In one embodiment, the LIN knows the subscriber data and it will also decide which GGSN has to be activated. In another embodiment, this may indicated by the SGSN.

The LIN sends a very similar PDP CONTEXT ACTIVATION REQUEST (only substituting its own address for that of the SGSN) to the GGSN which will believe that the LIN is the SGSN and will return CREATE PDP CONTEXT RESPONSE message to the LIN. The LIN will forward this response to the SGSN.

During this procedure the LIN has established its own routing table for the MS. Now the PDP context is activated and the SGSN will send all uplink data packets to the LIN and forward them to the GGSN. In the reverse direction, the GGSN will send all downlink data packets to the LIN which forwards them to the SGSN. The LIN thus duplicates all uplink and downlink traffic and forwards it to the LEA.

B.3. The SGSN Duplicating the Traffic

In this embodiment, the SGSN forwards all data and signalling traffic concerning the target MS to the LIN. To all other network elements it behaves quite normally. Thus the traffic passes normally from the MS to the SGSN, GGSN and the external network. Preferably, the SGSN can duplicate all GTP traffic and signalling passing through it and forwards them to the LIN. The SGSN should also be able to interpret mobility management messages exchanged with the target MS and forward them to the LIN encapsulated in GTP. The LIN should also be able to interpret these messages and select which information the LEA requires, and convert GPRS data and signalling to a protocol which the LEA can understand.

C. Legal Interception in the GGSN Only

Figure 2C:
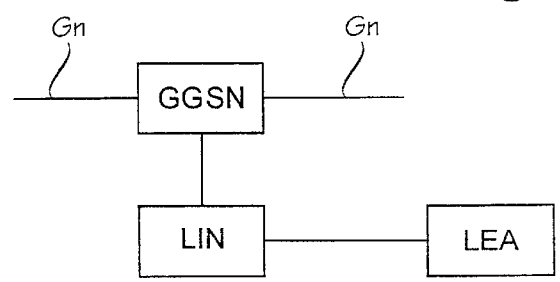

Referring now to FIG. 2C, the GGSN can intercept a target MS based on its IMSI or PDP address which can be entered into the GGSN by a Man-Machine Interface (MMI) or the OAM. When a PDP context is activated for a target MS, the GGSN will detect this. It will then duplicate the data packets related to the target MS and send the copies to the LIN. Also, all the signalling messages it receives it will forward to the LIN, preferably using GTP. Such signalling messages are PDP context activation/deactivation and the SGSN change (Update PDP Context Request/Response).

Functionality of the various network elements

An essential feature of the invention is the concept of the legal interception node, or LIN. Although physically the LIN may be located at various sites, logically (in terms of protocols and interfaces) it is a new and distinct network node. The LIN must be able to interpret GTP protocol and GPRS specific signalling. It must be able to communicate with the LEA. In most embodiments (although not in B.3 and C) the LIN should behave like an SGSN to a GGSN and vice versa, and it should be able to store routing contexts. In B.2 the LIN should behave like an HLR to the SGSN and vice versa. Preferably, the LIN should have a MAP/SS7 interface for transferring short messages. It could have the capability to convert short messages to another format which the LEA can understand. It could have a MAP/SS7 interface and the capability to receive and interpret subscriber data and/or forward it to the LEA.

In order to perform legal interception in a VPLMN, an SGSN must be able to mark a target MS (change its status in the subscriber data to "intercepted" or enter its ID into a list of targets). It must also be able to detect that a MS is to be intercepted. Moreover, in response to detecting such a target MS, it must modify its behaviour as described above under the various embodiments. In B.2 the SGSN must be able to ignore but acknowledge a cancel location message concerning a target MS. Optionally, the SGSN may be able to generate messages according to the signalling messages received (attach/detach, cell/routing area updates). These messages can be encapsulated in GTP and sent to the LIN. The SGSN may be able to accept cancel location messages from the LIN and execute them. In B.2 it should be able to indicate to the LIN which GGSN is to be activated (unless the LIN does this itself). In A.2 and B the SGSN may be able to store (or retrieve) the IP address (in B.2 the SS7 address) of the LIN.

In order to perform legal interception in the HPLMN, the HLR must be able to mark a target MS (e.g. change the status of the subscriber corresponding a certain IMSI to "intercepted"). For network activated context activation, the HLR may send to the GGSN the address (or the logical name) of the LIN instead of that of the SGSN. In A.1 the HLR may send modified subscriber data to an SGSN and send real subscriber data to the LIN. In A.2 it may indicate to an SGSN that an MS is a target MS.

A GGSN node must be able to detect a target MS, store or retrieve the address of the LIN, duplicate all GTP messages sent to the PDP context of the target MS and send them to the LIN.

Obviously, when the interception terminates, all network elements must able to undo the changes they have made and resume their normal behaviour.

The invention has been described in its preferred embodiments. However, the specifications for packet radio technology in general and GPRS in particular are developing rapidly. Such developments may require additional modifications to the invention. Therefore, all words and expressions should be interpreted broadly, and they are intended for illustrating rather than limiting the invention as described in the appended claims.

What is claimed is:

1. A method for intercepting traffic between a first support node and a second support node of a packet radio network; said traffic comprising data packets, each data packet having a payload and one or more headers; the method comprising:

installing a legal interception node into said network;

copying at least part of said traffic to be intercepted from at least one support node to said legal interception node in response to an order from a law enforcement authority; and sending at least part of said copied traffic from said legal interception node to said law enforcement authority;

wherein the copying comprises:

encapsulating the payload of each copied data packet; and sending the encapsulated payload to the legal interception node.

2. The method according to claim 1, wherein, said legal interception node converts said copied data packets to a format supported by said law enforcement authority before sending at least part of the copied traffic to the law enforcement authority.

3. The method according to claim 1 wherein, said telecommunications network supports at least one mobile station; some of said traffic comprises location information relating to said mobile station; and by means of said location information said legal interception node co-operates with said telecommunications network for maintaining a connection relating to the mobile station when it changes its location.

4. A method for intercepting a target mobile station in a packet radio network supporting General Packet Radio Service (GPRS), the packet radio network comprising at least one of each of the following network elements: a first support node, a second support node, and a home location register, wherein a unique address is defined for each one of said network elements; the method comprising:

installing a legal interception node into said network;

marking the mobile station as a target mobile station in response to an order from a law-enforcement authority to intercept one of the mobile stations; and copying at least some of the traffic relating to it from at least one of said support nodes of the packet radio network via said legal interception node to said law-enforcement authority in response to a mobile station being a target mobile station.

5. The method according to claim 4, wherein said coping comprises:

copying said packets relating to the mobile station to be intercepted from the at least one of the support nodes to the legal interception node; and routing said copied packets from the legal interception node to the law-enforcement authority.

6. The method according to claim 4 or 5, further comprising converting the packets to be copied to the law-enforcement authority to at least one format supported by said law-enforcement authority.

7. A legal interception node for legal interception of a target mobile station in a packet radio network, said legal interception node comprising:

means for storing information relating to the location of said target mobile station;

a first interface for communicating with a home location register and at least one support node of the network;

a second interface for communicating with a legal enforcement authority; and means for routing or copying information relating to said target mobile station from the first interface to the second interface.

8. The legal interception node according to claim 7, further comprising means for receiving short messages related to the target mobile station and means for converting said short messages to another format.

9. The legal interception node according to claim 7 or 8, further comprising means for emulating a support node of a first type to a support node of a second type and vice versa.

10. The legal interception node according to claim 7 or 8, further comprising means for emulating a support node of a first type to a home location register and vice versa.

11. A home location register of a packet radio network, adapted for legal interception of a number of target mobile stations in said network, the home location register comprising:

means for receiving a command from a law-enforcement authority to intercept at least one target mobile station;

memory means for storing status information indicating which ones of said mobile stations are target mobile stations; and means for sending modified information to other nodes of said network about said target mobile stations such that at least some packets originated therefrom or terminated thereto are copied by other network nodes to said law-enforcement authority.

12. The home location register according to claim 11, further comprising means for sending said modified information to a support node of said network and means for sending the unmodified information to another node of said network.

13. The home location register according to claim 11, further comprising means for forcing a reattach of a target mobile station, if said target mobile station is already attached.

14. A serving GPRS support node for a packet radio network, comprising:

means for storing and canceling information relating to the location of mobile stations in said network;

means for storing information indicating which ones of said mobile stations are target mobile stations and means for detecting such target mobile stations; and means for copying to a law-enforcement authority or a legal interception node at least some information derived from the packets originated from a target mobile station or terminated thereto, in response to detecting such a target mobile station.

15. The serving GPRS support node according to claim 14, further comprising means for ignoring but acknowledging an order for canceling location information related to a target mobile station.

16. A Gateway GPRS support node for a packet radio network, adapted for legal interception of traffic related to a number of terminals in said network, comprising:

means for receiving an identifier for each one of said terminals to be intercepted;

means for detecting a certain one of said terminals as a terminal to be intercepted; and means, responsive to said detecting means, for duplicating at least some of the traffic relating to said detected terminal to another node of said network.

* * * * *